(12) United States Patent
Chen

(10) Patent No.: US 10,997,941 B1
(45) Date of Patent: May 4, 2021

(54) ESL DRIVER MECHANISM CAPABLE OF DETERMINING WHETHER ALL ESL DRIVERS ARE BUSY OR IDLE WITHOUT FURTHER QUERYING OR POLLING ALL ESL DRIVERS

(71) Applicant: HIMAX TECHNOLOGIES LIMITED, Tainan (TW)

(72) Inventor: Ching-Lun Chen, Tainan (TW)

(73) Assignee: HIMAX TECHNOLOGIES LIMITED, Tainan (TW)

( * ) Notice: Subject to any disclaimer, the term of this patent is extended or adjusted under 35 U.S.C. 154(b) by 0 days.

(21) Appl. No.: 16/789,393

(22) Filed: Feb. 12, 2020

(51) Int. Cl.
*G09G 5/00* (2006.01)

(52) U.S. Cl.
CPC ......... *G09G 5/003* (2013.01); *G09G 2380/04* (2013.01)

(58) Field of Classification Search
CPC .................... G09G 5/003; G09G 2380/04
See application file for complete search history.

(56) References Cited

U.S. PATENT DOCUMENTS

| | | | | |
|---|---|---|---|---|
| 2006/0238307 A1* | 10/2006 | Bauer | ............... | G08B 13/2474 340/10.1 |
| 2015/0262630 A1* | 9/2015 | Shirakawa | ............ | G06F 3/0634 711/125 |
| 2015/0332356 A1* | 11/2015 | Byun | ...................... | G06F 3/147 345/2.3 |

* cited by examiner

*Primary Examiner* — Chanh D Nguyen
*Assistant Examiner* — Ngan T. Pham-Lu
(74) *Attorney, Agent, or Firm* — Winston Hsu

(57) ABSTRACT

An ESL driver circuit to be coupled to a host circuit and an ESL panel includes an ESL driver and a controlling transistor. The ESL driver has a serial clock input coupled to the serial clock port of the ESL driver circuit, a serial data input coupled to the serial data port of the ESL driver circuit, a control input coupled to the control port of the ESL driver circuit, and a busy output. The controlling transistor has a control terminal coupled to the busy output of the ESL driver, a first terminal coupled to a supply voltage level via a resistor, and a second terminal coupled to a ground level, and is configured to receive the busy output of the ESL driver to generate a busy signal at the first terminal.

12 Claims, 3 Drawing Sheets

ESL DRIVER MECHANISM CAPABLE OF DETERMINING WHETHER ALL ESL DRIVERS ARE BUSY OR IDLE WITHOUT FURTHER QUERYING OR POLLING ALL ESL DRIVERS

BACKGROUND OF THE INVENTION

1. Field of the Invention

The invention relates to ESL (Electronic Shelf Label) driver circuit architecture, and more particularly to an ESL driver circuit, method of multiple ESL display, and an ESL driver device having multiple ESL drivers and using a single busy port to connect a single busy port of a host circuit.

2. Description of the Prior Art

Generally speaking, a conventional ESL driver circuit usually needs to wait for a longer time period (e.g. from five seconds to fifteen seconds) to control an ESL panel to update the display picture/frame. A host circuit may be arranged to control multiple conventional ESL drivers by sending initialization command, power-on command, display update command, power-off command, and so on, to control the ESL drivers to drive different ESL panels. However, due to that different ESL drivers may adopt different oscillation frequencies, different initialization codes such as different frame rates, and/or different timings of sending drive signals to the ESL panels, the different ESL drivers may consume different time-length periods to complete the display picture update for corresponding ESL panels. Thus, a conventional scheme may use the host circuit to further send a query command to query/poll each ESL driver circuit to check whether all ESL drivers are busy or idle. The performance of conventional ESL drivers and ESL panels are limited due to the operation of querying each ESL driver circuit.

SUMMARY OF THE INVENTION

Therefore one of the objectives of the invention is to provide an ESL driver circuit, method of multiple ESL display, and an ESL driver device which are capable of determining whether all ESL drivers are busy or idle without further querying or polling all ESL drivers, to solve the above-mentioned problems.

According to an embodiment of the invention, an ESL driver circuit to be coupled to a host circuit and an ESL panel is disclosed. The ESL driver circuit comprises a busy port, a control port, a serial clock port, a serial data port, and ESL driver, and a controlling transistor. The busy port is coupled to a busy port of the host circuit via a busy line of a serial transmission protocol. The control port is coupled to a control port of the host circuit via a control line of the serial transmission protocol. The serial clock port is coupled to a serial clock port of the host circuit via a serial clock line of the serial transmission protocol. The serial data port is coupled to a serial data port of the host circuit via a serial data line of the serial transmission protocol. The ESL driver has a serial clock input coupled to the serial clock port of the ESL driver circuit, a serial data input coupled to the serial data port of the ESL driver circuit, a control input coupled to the control port of the ESL driver circuit, and a busy output. The controlling transistor has a control terminal coupled to the busy output of the ESL driver, a first terminal coupled to a supply voltage level via a resistor, and a second terminal coupled to a ground level, and is configured to receive the busy output of the ESL driver to generate a busy signal at the first terminal.

According to an embodiment of the invention, a method of multiple ESL display is disclosed. The method comprises: providing a first ESL driver circuit to be coupled to a host circuit and a first ESL panel, the first ESL driver circuit having a first ESL driver and a first controlling transistor having a control terminal coupled to a busy output of the first ESL driver; providing a second ESL driver circuit to be coupled to the host circuit and a second ESL panel, the second ESL driver circuit having a second ESL driver and a second controlling transistor having a control terminal coupled to a busy output of the second ESL driver; connecting a first terminal of the first controlling transistor with a first terminal of the second controlling transistor together to a busy port of the host circuit via a busy line of a serial transmission protocol; and aggregating information of the busy output of the first ESL driver with information of the busy output of the second ESL driver based on the first controlling transistor and the second controlling transistor, to generate a resultant busy signal to the busy port of the host circuit via the busy line of the serial transmission protocol.

According to an embodiment of the invention, an ESL driver device to be coupled to a host circuit and a plurality of ESL panels is disclosed. The ESL driver device comprises a busy port, a plurality of control ports, a serial clock port, a serial data port, a plurality of ESL drivers, and a controlling circuit. The busy port is coupled to a busy port of the host circuit via a busy line of a serial transmission protocol. The plurality of control ports are respectively coupled to a plurality of control ports of the host circuit via a plurality of control lines of the serial transmission protocol. The serial clock port is coupled to a serial clock port of the host circuit via a serial clock line of the serial transmission protocol. The serial data port is coupled to a serial data port of the host circuit via a serial data line of the serial transmission protocol. Each of the plurality of ESL drivers has a clock port coupled to the clock port of the ESL driver device, a serial data port coupled to the serial data port of the ESL driver device, and a corresponding control port coupled to a corresponding control port of the host circuit. The controlling circuit is coupled to a plurality of busy ports of the plurality of ESL drivers and the busy port of the ESL driver device, and is configured to aggregate all information at the plurality of busy ports of the plurality of ESL drivers to generate a resultant busy signal to the busy port of the ESL driver device.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
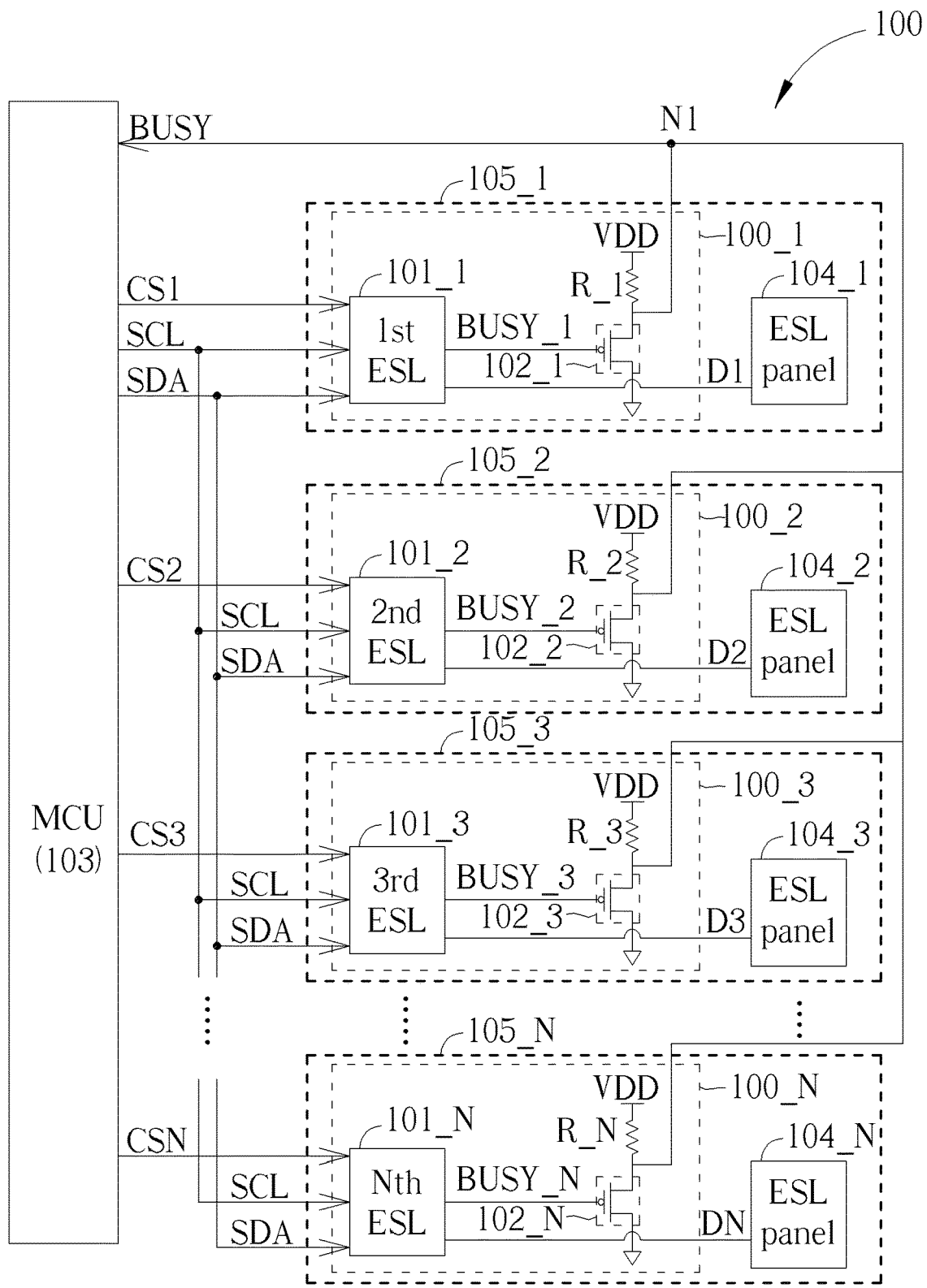
FIG. 1 is a block diagram showing the novel ESL circuit architecture comprising multiple ESL panel modules respectively coupled to the same microcontroller according to an embodiment of the invention.

FIG. 1 is a block diagram showing the novel ESL (Electronic Shelf Label) circuit architecture 100 comprising multiple ESL panel modules 105_1-105_N respectively coupled to the same microcontroller 103 according to an embodiment of the invention. The ESL panel modules 105_1-105_N respectively comprises ESL panels 104_1-104_N and ESL driver circuits 100_1-100_N which are respectively coupled to the ESL panels 104_1-104_N, i.e. the Chip-on-Glass structure. As shown in FIG. 1, each of the ESL driver circuits 100_1-100_N respectively comprise one of ESL drivers 101_1-101_N, one of controlling transistors 102_1-102_N, and one of resistors R_1-R_N.

Equivalently, the ESL circuit architecture 100 comprises a single busy port BUSY (coupled to the single busy port BUSY of host circuit 103), a serial clock port SCL (coupled to the serial clock port SCL of host circuit 103), a serial data port SDA (coupled to the serial data port SDA of host circuit 103), and multiple control ports CS1-CSN (respectively coupled to the control ports CS1-CSN of host circuit 103). The host circuit 103 such as a microcontroller (MCU) is coupled to the ESL circuit architecture 100 via a specific serial transmission protocol such as SPI protocol. The host circuit 103 has a single/master busy port/pin BUSY (corresponding to a busy line of SPI protocol), a serial clock port/pin SCL (corresponding to a serial clock line of SPI protocol), a serial data port/pin SDA (corresponding to a serial data line of SPI protocol), and N control ports/pins CS1 to CSN (corresponding to control lines of SPI protocol) wherein N is an integer equal to two or greater than two.

The ESL driver circuits 100_1-100_N for example are implemented by integrated circuits respectively and each driver circuit has a busy port/pin, a serial clock port/pin, a serial data port/pin, a control port/pin, and a drive output port/pin. The busy ports/pins of ESL driver circuits 100_1-100_N are aggregated and coupled to the same node N1 and then coupled to the single busy port BUSY of the host circuit 103. The information/signals of the logic/voltage levels at the busy ports/pins of all the ESL driver circuits 100_1-100_N are aggregated into one resultant busy signal via the node N1, and the resultant busy signal is transmitted to the single busy port BUSY of the host circuit 103. The serial clock ports/pins of ESL driver circuits 100_1-100_N are respectively coupled to the same serial clock port SCL of host circuit 103. The serial data ports/pins of ESL driver circuits 100_1-100_N are respectively coupled to the same serial data port SDA of host circuit 103. The control ports/pins of ESL driver circuits 100_1-100_N are respectively coupled to different control ports CS1-CSN of host circuit 103. Based on this architecture, the host circuit 103 is capable of controlling multiple different ESL driver circuits and ESL panels.

The ESL drivers 101_1-101_N of ESL driver circuits 100_1-100_N are coupled to N ESL panels 104_1-104_N and are arranged to generate different drive/control signals D1-DN, e.g. each comprising source and voltage control signals, to the corresponding N ESL panels 104_1-104_N respectively. As shown in FIG. 1, the busy outputs BUSY_1-BUSY_N of ESL drivers 101_1-101_N are respectively coupled to control terminals such as gates of the controlling transistors 102_1-102_N, e.g. PMOS transistor (but not limited). The serial clock inputs of ESL drivers 101_1-101_N are coupled to the same serial clock port/pin SCL of host circuit 103 to receive the serial clock signal from the serial clock port/pin SCL. The serial data inputs of ESL drivers 101_1-101_N are coupled to the same serial data port/pin SDA of host circuit 103 to receive the serial data signal transmitted from the serial data port/pin SDA. The control inputs of ESL drivers 101_1-101_N are respectively coupled to the control ports/pins CS1-CSN of host circuit 103 to receive different control signals from the control ports/pins CS1-CSN.

In practice, the N busy outputs BUSY_1-BUSY_N of the N ESL drivers 101_1-101_N are respectively coupled to the gates of the transistors 102_1-102_N, and the first terminals of the transistors 102_1-102_N are coupled together to the busy port/pin BUSY of host circuit 103 via the busy port/pin of ESL circuit architecture 100 and node N1. In addition, the first terminals of the transistors 102_1-102_N are also respectively coupled to the different resistors R_1-R_N and the supply voltage level VDD wherein the resistances of resistors R_1-RN are adjustable. Further, the second terminals of the transistors 102_1-102_N are coupled together to a ground voltage/level. Each transistor 102_1-102_N for example is an open drain I/O type PMOS transistor. Each PMOS transistor 102_1-102_N becomes conductive to cause the voltage level at its first terminal to the ground level (i.e. low logic/voltage level) when the voltage level at its gate terminal is switched to a low logic/voltage level. The logic/voltage level at the node N1 is switched to a high logic/voltage level only when all the voltage levels at the gate terminals of all the N transistors 102_1-102_N are switched to the high logic/voltage level and all the PMOS transistors 102_1-102_N are not conductive. Once least one PMOS transistor 102_1-102_N is conductive, the logic/voltage level at the node N1 is switched to the low logic/voltage level.

Figure 2:
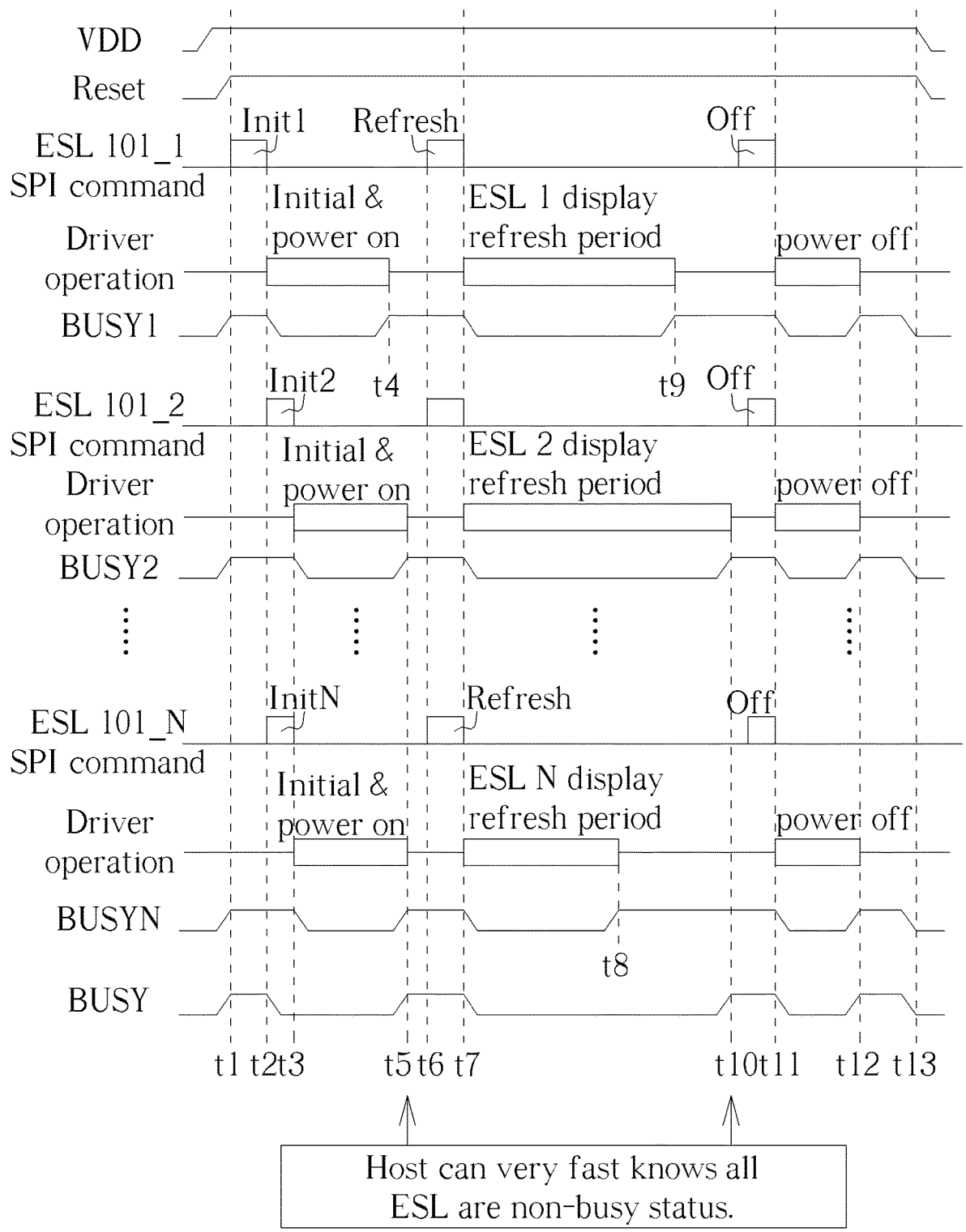
FIG. 2 is a signal diagram of the operations of the ESL circuit architecture according to an embodiment of the invention.

FIG. 2 is a signal diagram of the operations of the ESL circuit architecture 100 according to an embodiment of the invention. If a logic/voltage level at the busy port of an ESL driver circuit is a high logic/voltage level, this means that the ESL driver circuit now is idle and can receive and accept a control command of the host circuit 103 to enter the busy state to perform a specific control operation. If the logic/voltage level at the busy port of the ESL driver circuit is a low logic/voltage level, this may mean that the ESL driver circuit now has been at the busy state and in this situation does not accept another control command of the host circuit 103.

As shown in FIG. 2, for example, at time t1, all the N ESL drivers 101_1-101_N enter the idle state, and the logic/voltage levels at the busy ports of the N ESL drivers 101_1-101_N is switched from the low logic/voltage level to the high logic/voltage level. At the interval between time t1 and time t2, the ESL driver circuit 101_1 receives an initial command Init1 from the host circuit 103 via the control port CS1. Then, at time t2, the ESL driver circuit 101_1 starts initialization and performs power-on operations, and the logic/voltage level at the busy port BUSY_1 of the ESL driver circuit 101_1 is switched to the low logic/voltage level form the high logic/voltage level.

Then, for example (but not limited), at an interval between time t2 and time t3, other ESL drivers 101_2-101_N may simultaneously (not limited) receive the control commands Init2-InitN respectively from the host circuit 103 via the different control ports CS2-CSN. However, it is not meant to be a limitation. In other embodiments, the other ESL drivers 101_2-101_N mat sequentially receive the control commands Init2-InitN. Thus at time t3, the ESL drivers 101_2-101_N start initialization and perform power-on operations, and the logic/voltage levels at busy ports BUSY_2-BUSY_N of the ESL drivers 101_2-101_N is switched to the low logic/voltage level form the high logic/voltage level.

When at least one logic/voltage level of at least one busy port BUSY_1-BUSY_N is switched to the low logic/voltage level while other logic/voltage levels are high levels, a corresponding transistor corresponding to the at least one busy port BUSY_1-BUSY_N becomes conductive and then the voltage level at node N1 will be switched to the low logic/voltage level (e.g. at time t2). At time t2, by detecting that the logic/voltage level at its single busy port BUSY is switched from the high level to the low level, the host circuit 103 can know that at least one ESL driver circuit becomes busy.

Then, the initialization and power-on operations of ESL driver circuit 101_1 are completed and end at time t4, and the logic/voltage level of busy port BUSY_1 is switched from the low logic/voltage level to the high logic/voltage level. Then, the initialization and power-on operations of ESL drivers 101_2-101_N are completed and end at time t5, and the logic/voltage levels of busy ports BUSY_2-BUSY_N of ESL drivers 101_2-101_N are respectively switched from the low logic/voltage level to the high logic/voltage level.

At time t5, since all the logic/voltage levels are switched to the high logic/voltage level, the N transistors 102_1-102_N are turned off so that the voltage level at the node N1 becomes at the high level (disconnected from the ground level). Thus, the voltage level at single busy port BUSY of host circuit 103 is also at the high logic/voltage level and thus the host circuit 103 can directly determine that all the ESL drivers 101_1-101_N are at the idle state without further sending a query request signal to query any one of the ESL drivers 101_1-101_N. The host circuit 103 for example can rapidly start to send the refresh commands via the control ports CS1-CSN to the ESL drivers 101_1-101_N at time t6 to control the ESL drivers 101_1-101_N perform panel display update. At the interval between time t6 and time t7, the ESL drivers 101_1-101_N are arranged to receive the refresh commands from the host circuit 103 via the ports CS1-CSN respectively. The time wasted by sequentially querying and waiting any one of the ESL drivers 101_1-101_N is saved.

Then, at time t7, the ESL drivers 101_1-101_N respectively and simultaneously start to perform display refresh operations to control corresponding ESL panels for display. Then, for example, the display refresh operation of ESL driver circuit 101_N is finished at time t8, and thus the logic/voltage level at the busy port BUSY_N of ESL driver circuit 101_N is switched from the low logic/voltage level to the high logic/voltage level. The display refresh operation of ESL driver circuit 101_1 is finished at time t9, and thus the logic/voltage level at the busy port BUSY_1 of ESL driver circuit 101_1 is switched from the low logic/voltage level to the high logic/voltage level. The display refresh operation of ESL driver circuit 101_2 for example is finished at time t10 and ends at the latest, and the logic/voltage level at the busy port BUSY_2 of ESL driver circuit 101_2 is switched from the low logic/voltage level to the high logic/voltage level. In this example, when the logic/voltage levels at all the busy ports BUSY_1-BUSY_N are switched to the high logic/voltage level at time t10, the logic/voltage level at the single busy port BUSY of the host circuit 103 is thus switched from the low logic/voltage level to the high logic/voltage level. By detecting the signal level change at its single busy port BUSY, the host circuit 103 can immediately determine that all the N ESL drivers 101_1-101_N become at the idle state without further sending a query request signal to any one of the ESL drivers 101_1-101_N to ask whether all the circuits at idle. At time t12 the host circuit 103 can rapidly sends power-off commands to the ESL drivers 101_1-101_N to turn off the ESL drivers 101_1-101_N, and the ESL drivers 101_1-101_N at time t12 are powered off based on the received power-off commands and thus the logic/voltage levels at the busy ports BUSY_1-BUSY_N are switched from the high logic/voltage level to the low logic/voltage level. Then, the ESL drivers 101_1-101_N are powered on or waked up at time t13, and the logic/voltage levels at the busy ports BUSY_1-BUSY_N are switched from the low logic/voltage level to the high logic/voltage level.

By adopting the circuit architecture 100 provided by the invention, it is not required and not necessary for the host circuit 103 to sequentially poll/query all the ESL drivers 101_1-101_N or send a query request to any one of the ESL drivers 101_1-101_N. The host circuit 103 can directly determine whether all the ESL drivers 101_1-101_N are idle or not based on the signal waveform of its single busy port BUSY wherein an ESL driver circuit at the idle state means that such ESL driver circuit now can receive and accept a control command sent from the host circuit to perform a corresponding operation while an ESL driver circuit not at the idle state means that such ESL driver circuit now is not ready to receive and accept a control command sent from the host circuit. The whole performance can be significantly improved since the wasted time period for polling the ESL drivers 101_1-101_N can be saved.

Further, in another modification embodiment, each transistor 102_1-102_N for example is implemented by an NMOS transistor and becomes conductive to cause the voltage level at its first terminal to the ground level (i.e. low logic/voltage level) when the voltage level at its gate terminal is switched to the high logic/voltage level. The logic/voltage level at node N1 is switched to the high logic/voltage level only when all the voltage levels at the gate terminals of all the N transistors 102_1-102_N are switched to the low logic/voltage level and all the NMOS transistors 102_1-102_N are not conductive. Once at least one NMOS transistor 102_1-102_N is conductive, the logic/voltage level at the node N1 is switched to the low logic/voltage level. In this example, the high logic/voltage level at the busy port of each ESL driver circuit 100_1-100_N means that the ESL driver circuit now is busy and does not accept another control command of the host circuit 103, and the low logic/voltage level at the busy port of each ESL driver circuit 100_1-100_N means that the ESL driver circuit now is idle and can receive and accept a control command of the host circuit 103 to enter the busy state to perform a specific control operation. This modification also obeys the spirit of the invention.

Further, in other embodiments, the resistors R_1-RN can be implemented by using a single resistor circuit which is configured outside each ESL driver circuit 100_1-100_N.

Figure 3:
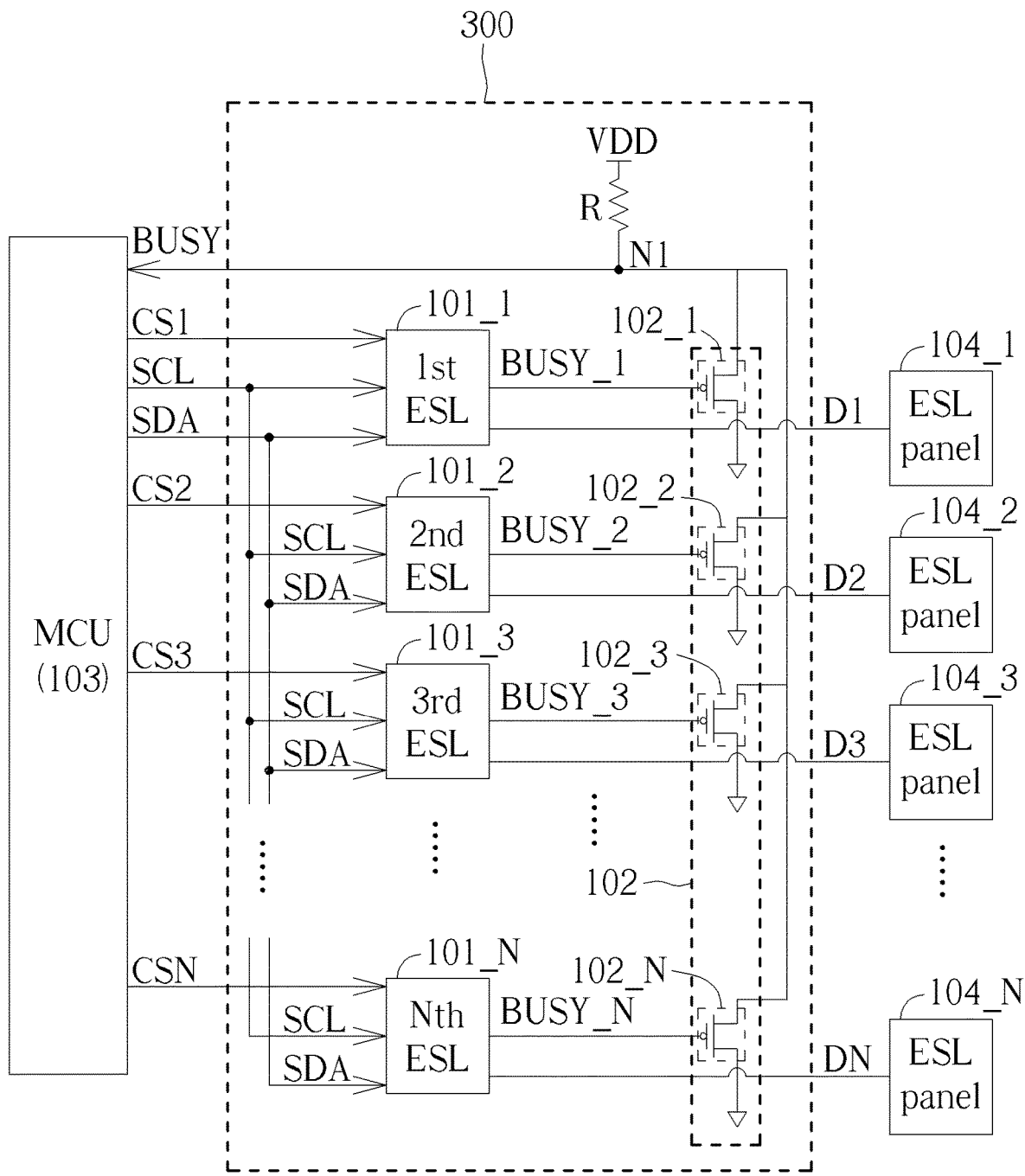
FIG. 3 is a block diagram of an ESL driver device comprising multiple ESL drivers and controlling transistors according to an embodiment of the invention.

Additionally, in other embodiments, the multiple ESL drivers 101_1-101_N and transistors 102_1-102_N may be integrated into a same circuit module, i.e. Chip-on-Film structure. FIG. 3 is a block diagram of an ESL (Electronic Shelf Label) driver device 300 comprising multiple ESL drivers and controlling transistors according to an embodiment of the invention. The ESL driver device 300 comprises a single busy port BUSY (coupled to the single busy port BUSY of host circuit 103), a serial clock port SCL (coupled to the serial clock port SCL of host circuit 103), a serial data port SDA (coupled to the serial data port SDA of host circuit 103), multiple control ports CS1-CSN (respectively coupled to the control ports CS1-CSN of host circuit 103), the N ESL drivers 101_1-101_N, a controlling circuit 102 comprising N corresponding transistors 102_1-102_N connected in parallel, and the resistor R. The N ESL drivers 101_1-101_N are coupled to N ESL panels 104_1-104_N and are arranged to generate different drive signals D1-DN to the corresponding N ESL panels 104_1-104_N to drive the N ESL panels 104_1-104_N respectively. The controlling circuit 102 is used to aggregate all information/signals of the logic/voltage levels at the busy ports of the N ESL drivers 101_1-101_N to generate a resultant and single busy signal and notify the host circuit 103 of such resultant and single busy signal via the single busy port BUSY. The controlling circuit 102 is used to aggregate all information/signals of the logic/voltage levels at the busy ports of the N ESL drivers 101_1-101_N to generate a resultant and single busy signal and notify the host circuit 103 of such resultant and single busy signal via the single busy port BUSY. Other operations are similar to those mentioned in FIG. 1, and are not detailed for brevity.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An ESL driver circuit to be coupled to a host circuit and an ESL panel, comprising:
    a busy port, coupled to a busy port of the host circuit via a busy line of a serial transmission protocol;
    a control port, coupled to a control port of the host circuit via a control line of the serial transmission protocol;
    a serial clock port, coupled to a serial clock port of the host circuit via a serial clock line of the serial transmission protocol;
    a serial data port, coupled to a serial data port of the host circuit via a serial data line of the serial transmission protocol;
    an ESL driver having a serial clock input coupled to the serial clock port of the ESL driver circuit, a serial data input coupled to the serial data port of the ESL driver circuit, a control input coupled to the control port of the ESL driver circuit, and a busy output; and
    a controlling transistor, having a control terminal coupled to the busy output of the ESL driver, a first terminal coupled to a supply voltage level via a resistor, and a second terminal coupled to a ground level, configured to receive the busy output of the ESL driver to generate a busy signal at the first terminal.

2. The ESL driver circuit of claim 1, wherein the first terminal of the controlling transistor of the ESL driver circuit is arranged to be coupled to another first terminal of another controlling transistor of another ESL driver circuit and coupled together to the busy port of the host circuit via the busy line of the serial transmission protocol.

3. The ESL driver circuit of claim 1, wherein the controlling transistor is implemented using an open drain I/O type transistor.

4. The ESL driver circuit of claim 1, wherein the controlling transistor is a PMOS transistor; a high logic level of the busy output of the ESL driver indicates that the ESL driver is idle while a low logic level of the busy output of the ESL driver indicates that the ESL driver is busy.

5. The ESL driver circuit of claim 1, wherein the controlling transistor is an NMOS transistor; a high logic level of the busy output of the ESL driver indicates that the ESL driver is busy while a low logic level of the busy output of the ESL driver indicates that the ESL driver is idle.

6. A method of multiple ESL display, comprising:
    providing a first ESL driver circuit to be coupled to a host circuit and a first ESL panel, the first ESL driver circuit having a first ESL driver and a first controlling transistor having a control terminal coupled to a busy output of the first ESL driver;
    providing a second ESL driver circuit to be coupled to the host circuit and a second ESL panel, the second ESL driver circuit having a second ESL driver and a second controlling transistor having a control terminal coupled to a busy output of the second ESL driver;
    connecting a first terminal of the first controlling transistor with a first terminal of the second controlling transistor together to a busy port of the host circuit via a busy line of a serial transmission protocol; and
    aggregating information of the busy output of the first ESL driver with information of the busy output of the second ESL driver based on the first controlling transistor and the second controlling transistor, to generate a resultant busy signal to the busy port of the host circuit via the busy line of the serial transmission protocol.

7. An ESL driver device to be coupled to a host circuit and a plurality of ESL panels, comprising:
    a busy port, coupled to a busy port of the host circuit via a busy line of a serial transmission protocol;
    a plurality of control ports, respectively coupled to a plurality of control ports of the host circuit via a plurality of control lines of the serial transmission protocol;
    a serial clock port, coupled to a serial clock port of the host circuit via a serial clock line of the serial transmission protocol;
    a serial data port, coupled to a serial data port of the host circuit via a serial data line of the serial transmission protocol;
    a plurality of ESL drivers each having a clock port coupled to the clock port of the ESL driver device, a serial data port coupled to the serial data port of the ESL driver device, and a corresponding control port coupled to a corresponding control port of the host circuit; and
    a controlling circuit, coupled to a plurality of busy ports of the plurality of ESL drivers and the busy port of the ESL driver device, configured to aggregate all information at the plurality of busy ports of the plurality of ESL drivers to generate a resultant busy signal to the busy port of the ESL driver device.

8. The ESL driver device of claim 7, wherein the controlling circuit comprises:
    a plurality of transistors connected in parallel, the plurality of transistors having a plurality of control terminals respectively coupled to the plurality of busy ports of the plurality of ESL drivers to receive a plurality of signal levels respectively generated from the plurality of busy ports of the plurality of ESL drivers, a plurality of first terminals respectively coupled to a reference voltage, and a plurality of second terminals respectively coupled together and coupled to the busy port of the ESL driver device.

9. The ESL driver device of claim 8, wherein each of the plurality of control transistors is implemented using an open drain I/O type transistor.

10. The ESL driver device of claim 8, wherein a specific transistor among the plurality of transistors is turned on to become conductive when a logic level at a control terminal of the specific transistor is at a low logic level, and the specific transistor is turned off when the logic level at the control terminal of the specific transistor is at a high logic level.

11. The ESL driver device of claim 7, wherein the controlling circuit is arranged to control a logic level at the busy port of the ESL driver device be switched form a high logic level to a low logic level when at least one logic level of at least one busy port of at least one ESL driver circuit is switched from the high logic level to the low logic level.

12. The ESL driver device of claim 7, wherein the controlling circuit is arranged to control a logic level at the busy port of the ESL driver device be switched form a low logic level to a high logic level only when all logic levels of all busy ports of all the plurality of ESL drivers are switched from the low logic level to the high logic level.

* * * * *